US011755335B2

(12) United States Patent
Hung et al.

(10) Patent No.: US 11,755,335 B2
(45) Date of Patent: Sep. 12, 2023

(54) BIOS VARIABLE-BASED APPLICATION DEPLOYMENTS

(71) Applicant: Hewlett-Packard Development Company, L.P., Spring, TX (US)

(72) Inventors: Ming Chang Hung, Taipei (TW); Yun-Chu Chen, Taipei (TW); Shih-Ding Lee, Taipei (TW); Nathan Edward Kofahl, Rio Rancho, NM (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 161 days.

(21) Appl. No.: 17/535,734

(22) Filed: Nov. 26, 2021

(65) Prior Publication Data

US 2023/0168901 A1    Jun. 1, 2023

(51) Int. Cl.
*G06F 9/4401* (2018.01)
*G06F 1/3203* (2019.01)
*G06F 8/61* (2018.01)
*G06F 8/65* (2018.01)

(52) U.S. Cl.
CPC .......... *G06F 9/4406* (2013.01); *G06F 1/3203* (2013.01); *G06F 8/61* (2013.01); *G06F 8/65* (2013.01); *G06F 9/4411* (2013.01)

(58) Field of Classification Search
CPC ......... G06F 9/4406; G06F 1/3203; G06F 8/61
See application file for complete search history.

(56) References Cited

U.S. PATENT DOCUMENTS

| 5,680,547 A | 10/1997 | Chang |
| 6,115,813 A * | 9/2000 | Hobson ..................... G06F 1/26 713/1 |
| 7,072,950 B2 | 7/2006 | Toft |
| 7,293,115 B2 | 11/2007 | DaCosta et al. |
| 9,760,363 B2 | 9/2017 | Dicks et al. |
| 2004/0243534 A1* | 12/2004 | Culter .................. G06F 9/4411 |
| 2018/0276000 A1 | 9/2018 | Roszak et al. |
| 2021/0334087 A1* | 10/2021 | Wynn ....................... G06F 1/24 |

* cited by examiner

*Primary Examiner* — Jaweed A Abbaszadeh
*Assistant Examiner* — Gayathri Sampath
(74) *Attorney, Agent, or Firm* — Knobbe, Martens, Olson & Bear, LLP

(57) ABSTRACT

In an example, a computing device includes a non-volatile storage device to store a basic input/output system (BIOS) variable. Further, the computing device includes a BIOS. During a boot process of the computing devices, the BIOS may read the BIOS variable from the non-volatile storage device. Further, the BIOS may detect that an application is to be deployed in the computing device based on the BIOS variable. Furthermore, the BIOS may load an application package from the non-volatile storage device into a volatile storage device and build an advanced configuration and power interface (ACPI) data structure with the application package loaded in the volatile storage device. Further, the BIOS may deploy the application using the ACPI data structure.

20 Claims, 9 Drawing Sheets

BIOS VARIABLE-BASED APPLICATION DEPLOYMENTS

BACKGROUND

Enterprises may provide employees with corporate-owned computing devices, such as laptops, tablets, personal computers (PCs), and the like. Such computing devices may have to undergo an initial setup before being given to an employee. For example, an administrator may have to install a specific operating system and applications on the computing device. The administrator can also take steps to enroll the computing device with an enterprise management system before handing over the computing device to the employee. For example, the administrator may need to monitor the computing device and scan issues via a management application. Without management application installed on the computing device, the computing device may not be secure, and the employee can lose information on the computing device. The management application can either be pre-installed during manufacture or downloaded in an application-form. For example, installing the management application, hardware, drivers, and configurations can be done as part of a device enrolment program.

BRIEF DESCRIPTION OF THE DRAWINGS

Examples are described in the following detailed description and in reference to the drawings, in which.

DETAILED DESCRIPTION

Figure 1A:
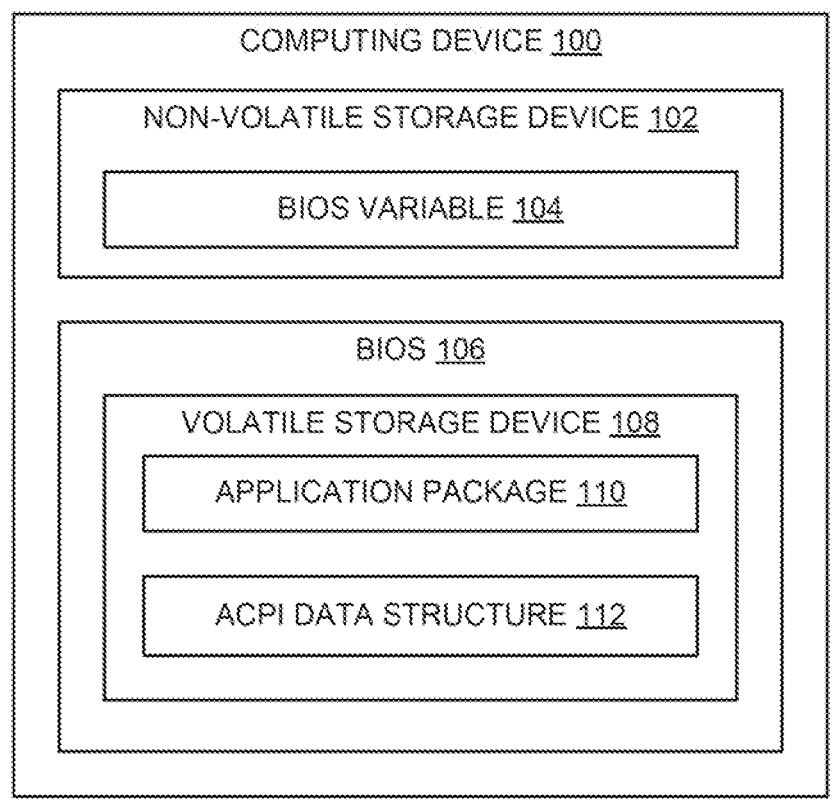
FIG. 1A is a block diagram of an example computing device, including a basic input/output system (BIOS) to deploy an application using a BIOS variable.

Enterprises may provide employees with corporate-owned computing devices. Such computing devices may involve an initial setup before being given to an employee. For example, an administrator may have to install a specific application (e.g., a management application) on the computing device. In this example, a cumbersome task of individual user device setup falls to the enterprise. The enterprises wishing to enroll the computing device into an enterprise management system may have to manually configure each computing device. With an increase in a number of employees in a workforce, the initial setup can be a significant drain on company resources. Further, such setup process is repeated when the computing device malfunctions or is assigned to a new employee, or when an employee upgrades to a new device. Therefore, an enterprise may involve additional manpower for provisioning the computing devices to the employees, which can result in an increased enterprise's costs. The setup process may also produce delays in providing employees with new computing devices, which lowers the efficiency of the enterprise's workforce. Also, the administrator may face a challenge in deploying (e.g., installing or upgrading) the management application in the computing device, for instance, when a user upgrades the computing device equipment, the user is a new employee, or when the user works from a remote location (e.g., out of office).

Without management application installed on the computing device, the computing device may not be secure, and the employee can lose information on the computing device. In some example methods, management applications can either be pre-installed during manufacture or downloaded in an application-form. However, the pre-installed management applications can be deleted when user builds an operating system image. Also, pre-installing the management applications may increase the management cost and may not be flexible as the enterprise has to purchase/license the management application first and then install on the computing device. Further, the management application, in application form, may involve installation, upgradation, and version control. In this example, the management application can be wiped out when creating an operating system image. Also, the management application, in application form, may involve an additional deployment cost.

Examples described herein provides a computing device including a non-volatile storage device to store a basic input/output system (BIOS) variable, a processor, and a BIOS. During an operating system phase, the processor may determine whether the application is to be deployed (e.g., installed or upgraded), for instance, by communicating with an external server via an update service. Further, the processor may obtain the application package from an external server via the update service. Furthermore, the processor may generate the BIOS variable including the application package. The BIOS variable may report the BIOS that the application is to be deployed. Further, the processor stores the BIOS variable in the non-volatile storage device via a BIOS runtime service.

During a boot process of the computing device, the BIOS may read the BIOS variable from the non-volatile storage device. Further, the BIOS may detect that an application is to be deployed in the computing device based on the BIOS variable. Furthermore, the BIOS may load an application package from the non-volatile storage device into a volatile storage device. Also, the BIOS may build an advanced configuration and power interface (ACPI) data structure with the application package loaded in the volatile storage device and deploy the application using the ACPI data structure.

For example, the application may be a management application that allows an enterprise to manage functional aspects of the computing device based on policies defined at a management server. The management application can be injected, configured, or otherwise installed into the operating system (e.g., Windows) prior to boot-up of the operating system. The management application can implement a management policy. The management policy can enforce various functionalities and compliance rules such as specifying passcode requirements, providing wireless fidelity (Wi-Fi) configurations, controlling network access, and the like.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a block diagram of an example computing device 100, including a BIOS 106 to deploy an application using a BIOS variable 104. Example computing device 100 is a notebook computer, a tablet computer, a desktop computer, or the like. As shown in FIG. 1A, computing device 100 includes a non-volatile storage device 102. Non-volatile storage device 102 may store BIOS variable 104. Example non-volatile storage device 102 is a read only memory (ROM) storage device (e.g., serial peripheral interface (SPI) flash memory).

Further, computing device 100 may include BIOS 106. As used herein, BIOS 106 may refer to hardware or hardware and instructions to initialize, control, or operate computing device 100 prior to execution of an operating system of computing device 100. Instructions included within BIOS 106 may be software, firmware, microcode, or other programming that defines or controls functionality or operation of BIOS 106. In an example, BIOS 106 may be implemented using instructions, such as platform firmware of computing device 100, executable by a processor. BIOS 106 may operate or execute prior to the execution of the operating system of computing device 100. BIOS 106 may initialize, control, or operate components such as hardware components of computing device 100 and may load or boot the operating system of computing device 100.

In some examples, BIOS 106 may provide or establish an interface between hardware devices or platform firmware of computing device 100 and the operating system of computing device 100, via which the operating system of computing device 100 may control or operate hardware devices or platform firmware of computing device 100. In some examples, BIOS 106 implements the Unified Extensible Firmware Interface (UEFI) specification or another specification or standard for initializing, controlling, or operating computing device 100.

The BIOS or UEFI specification may refer to data attributes written in a read only memory (ROM) which can be accessible upon powering-on of computing device 100, to perform a boot operation (e.g., device recognition, initialization, or the like) at the time of boot. Such data attributes indispensable to the boot operation may be stored in the form of BIOS variables (e.g., UEFI variables).

In the example shown in FIG. 1A, BIOS variable 104 may provide an interface through which the operating system can interact with BIOS 106. The BIOS or UEFI specification may provide a set of functions that are accessible to both the early boot environment and to the operating system. Such functions are known as the "BIOS runtime services." Example BIOS runtime service includes a SetVariable service to write/delete BIOS variable 104 and a GetVariable service to read BIOS variable 104. BIOS variable 104 may be accessible during system management mode (SMM) runtime as well as during boot time. The GetVariable and SetVariable services may be used by BIOS 106 during a boot process of computing device 100 and additionally the use of the GetVariable and SetVariable functions may be supported by the operating system after the operating system has booted.

During the boot process of computing device 100, BIOS 106 may read BIOS variable 104 from non-volatile storage device 102. Further, BIOS 106 may detect that an application is to be deployed in computing device 100 based on BIOS variable 104. In an example, BIOS variable 104 may be generated by the operating system to report BIOS 106 that the application is to be installed or upgraded.

Furthermore, BIOS 106 may load an application package 110 from non-volatile storage device 102 into a volatile storage device 108. Upon loading application package 110, BIOS 106 may build an advanced configuration and power interface (ACPI) data structure 112 with application package 110 loaded in volatile storage device 108. For example, ACPI data structure 112 is a Windows platform binary table (WPBT) that enables BIOS 106 to provide the operating system with a platform binary that the operating system can execute to deploy the application. Further, BIOS 106 may deploy the application using ACPI data structure 112. As used herein, deploying the application refers to installing a new application in computing device 100 or upgrading a version of the application running in computing device 100. Further, BIOS 106 may remove application package 110 from non-volatile storage device 102 upon completion of deploying the application.

Further, BIOS 106 may update BIOS variable 104 to include a status information of the deployment of the application in computing device 100. In an example, the status information indicates a success or failure of the deployment of the application, a current version of the deployed application, and a previous version of the application.

Furthermore, BIOS 106 may populate an extensible firmware interface (EFI) system resource table (ESRT) with the status information of the deployment of the application. In an example, BIOS 106 may populate the ESRT with the status information using updated BIOS variable 104, for instance, in a next boot of computing device 100. Further, BIOS 106 may publish the ESRT to the operating system of computing device 100.

Figure 1B:
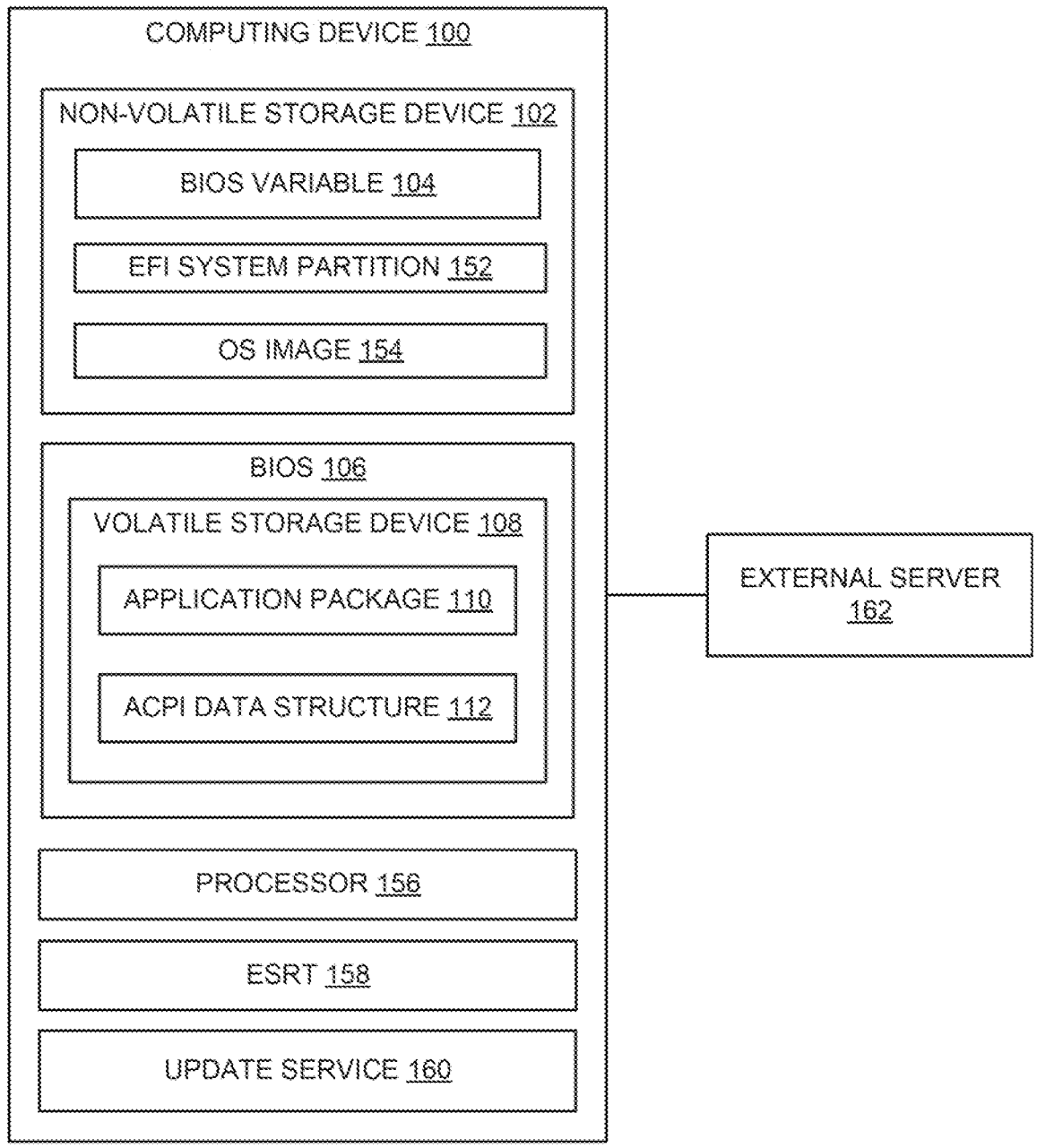
FIG. 1B is a block diagram of the example computing device of FIG. 1A, depicting additional features.

FIG. 1B is a block diagram of example computing device 100 of FIG. 1A, depicting additional features. For example, similarly named elements of FIG. 1B may be similar in structure and/or function to elements described with respect to FIG. 1A. As shown in FIG. 1B, computing device 100 includes a processor 156. When computing device 100 powers on, BIOS 106 may initialize the boot process, which can include loading the operating system. The operating system can be a Windows operating system. The operating system can exist locally and be referenced by BIOS 106, for instance. For example, a drive partition in computing device 100 can store a copy of the operating system, which can be called an OS image 154.

Upon loading the operating system of computing device 100, processor 156 may utilize an update service 160 to communicate with an external server 162 via a network to determine whether the application is to be deployed based on the status information in the ESRT (e.g., an ESRT 158). For example, external server 162 is a Windows update server and update service 160 is a Windows update service. In response to determination that the application is to be deployed, processor 156 may obtain application package 110 from external server 162.

Further, processor 156 may generate BIOS variable 104 including obtained application package 110. Furthermore, processor 156 may store BIOS variable 104 in non-volatile storage device 102 via a BIOS runtime service. In an example, BIOS 106 loads application package 110 from non-volatile storage device 102 into volatile storage device 108 by:

copying application package 110 from BIOS variable 104 to an extensible firmware interface (EFI) system partition 152 on non-volatile storage device 102 during a first boot process of computing device 100, and loading application package 110 from EFI system partition 152 into volatile storage device 108 during a next boot process of computing device 100. Upon completion of deploying the application, BIOS 106 may remove application package 110 from EFI system partition 152 of non-volatile storage device 102.

Figure 2A:
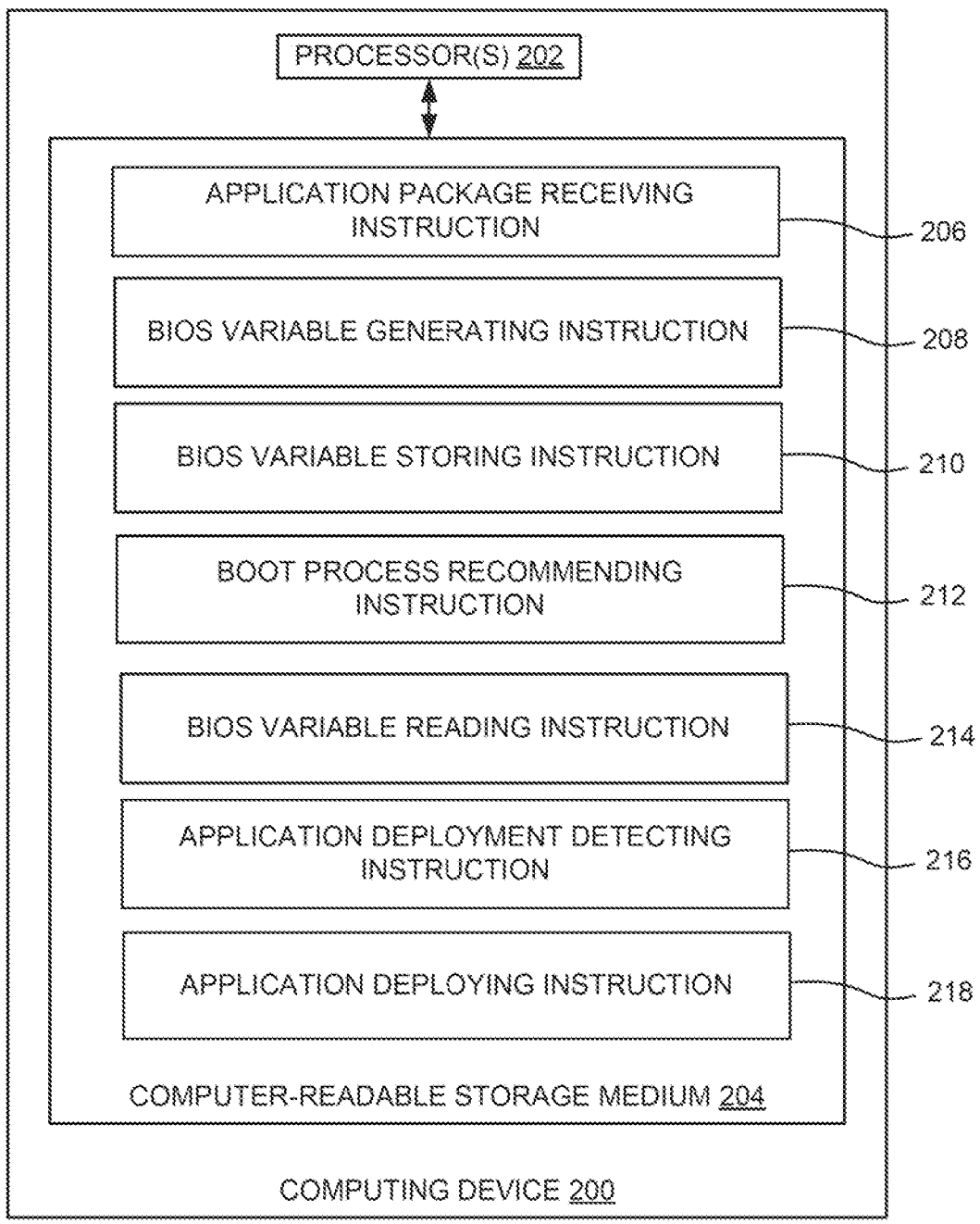
FIG. 2A is a block diagram of an example computing device including a non-transitory computer-readable storage medium, storing instructions to deploy an application in the computing device.

FIG. 2A is a block diagram of an example computing device 200 including a non-transitory computer-readable storage medium 204, storing instructions to deploy an application in computing device 200. Computing device 200 includes a processor 202 and computer-readable storage medium 204 communicatively coupled through a system bus. Processor 202 may be any type of CPU, microprocessor, or processing logic that interprets and executes computer-readable instructions stored in computer-readable storage medium 204.

Computer-readable storage medium 204 may be a random-access memory (RAM) or another type of dynamic storage device that may store information and computer-readable instructions that may be executed by processor 202. For example, computer-readable storage medium 204 may be synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, computer-readable storage medium 204 may be a non-transitory computer-readable medium, where the term "non-transitory" does not encompass transitory propagating signals. In an example, computer-readable storage medium 204 may be remote but accessible to computing device 200.

Computer-readable storage medium 204 stores instructions 206, 208, 210, 212, 214, 216, and 218. Instructions 206 may be executed by processor 202 to receive an application package associated with an application to be deployed. Instructions 208 may be executed by processor 202 to generate a BIOS variable including the application package. The BIOS variable may report a BIOS that the application is to be deployed. In an example, instructions to generate the BIOS variable include instructions to:

utilize an update service running in computing device 200 to communicate with an external server via a network to determine whether the application is to be deployed, in response to determination that the application is to be deployed, receive the application package from the external server via the update service, and generate the BIOS variable including the received application package.

In an example, the external server is a Windows update server, and the update service is a Windows update service. Instructions 210 may be executed by processor 202 to store the BIOS variable in a non-volatile storage device of computing device 200 via a BIOS runtime service. Instructions 212 may be executed by processor 202 to recommend booting computing device 200 upon storing the BIOS variable. In other examples, processor 202 may initiate booting of computing device 200 upon storing the BIOS variable.

Instructions 214, 216, and 218 may be executed by processor 202 during a boot process of computing device 200. Instructions 214 may be executed by processor 202 to read the BIOS variable from the non-volatile storage device. Instructions 216 may be executed by processor 202 to detect that the application is to be deployed based on the BIOS variable. Instructions 218 may be executed by processor 202 to deploy the application in computing device 200 using the application package in the non-volatile storage device. In an example, instructions 218 to deploy the application in computing device 200 using the application package include instructions to:

load the application package from the non-volatile storage device into a volatile storage device, build an ACPI data structure with the application package loaded in the volatile storage device, and deploy the application using the ACPI data structure.

Figure 2B:
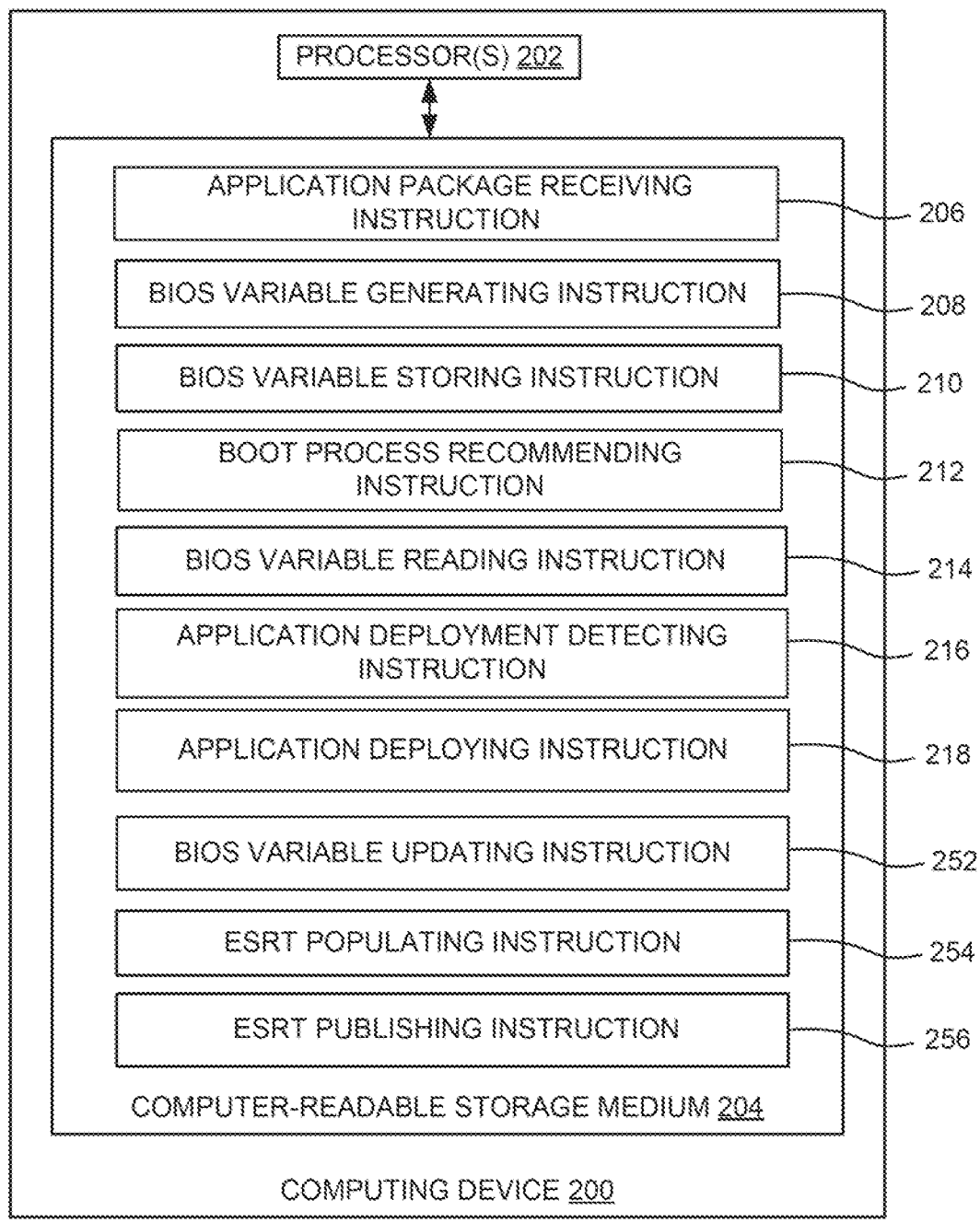
FIG. 2B is a block diagram of the example computing device of FIG. 2A, depicting additional features.

FIG. 2B is a block diagram of example computing device 200 of FIG. 2A, depicting additional features. For example, similarly named elements of FIG. 2B may be similar in structure and/or function to elements described with respect to FIG. 2A. As shown in FIG. 2B, computer-readable storage medium 204 stores instructions 252, 254, and 256. Instructions 252 may be executed by processor 202 to update the BIOS variable to include a status information of the deployment of the application in computing device 200 during the boot process. In an example, the status information indicates a success or failure of the deployment of the application, a current version of the deployed application, and a previous version of the application.

Instructions 254 may be executed by processor 202 to populate an ESRT with a status information of the deployment of the application. Instructions 256 may be executed by processor 202 to publish the ESRT to an operating system of computing device 200. In an example, the ESRT is used by an external server to determine whether the application is to be deployed.

In other examples, computer-readable storage medium 204 stores instructions to create, by the BIOS, a deployment node (e.g., a virtual device) in a BIOS setup menu. For example, during the boot process, a hot key (e.g., F10) can be pressed in a keyboard to allow computing device 200 to enter the BIOS setup menu. Further, the deployment node may be created in the BIOS setup menu upon entering the BIOS setup menu. Furthermore, computer-readable storage medium 204 stores instructions to receive, by the operating system, the application package associated with the deployment node from an update service.

Figure 3A:
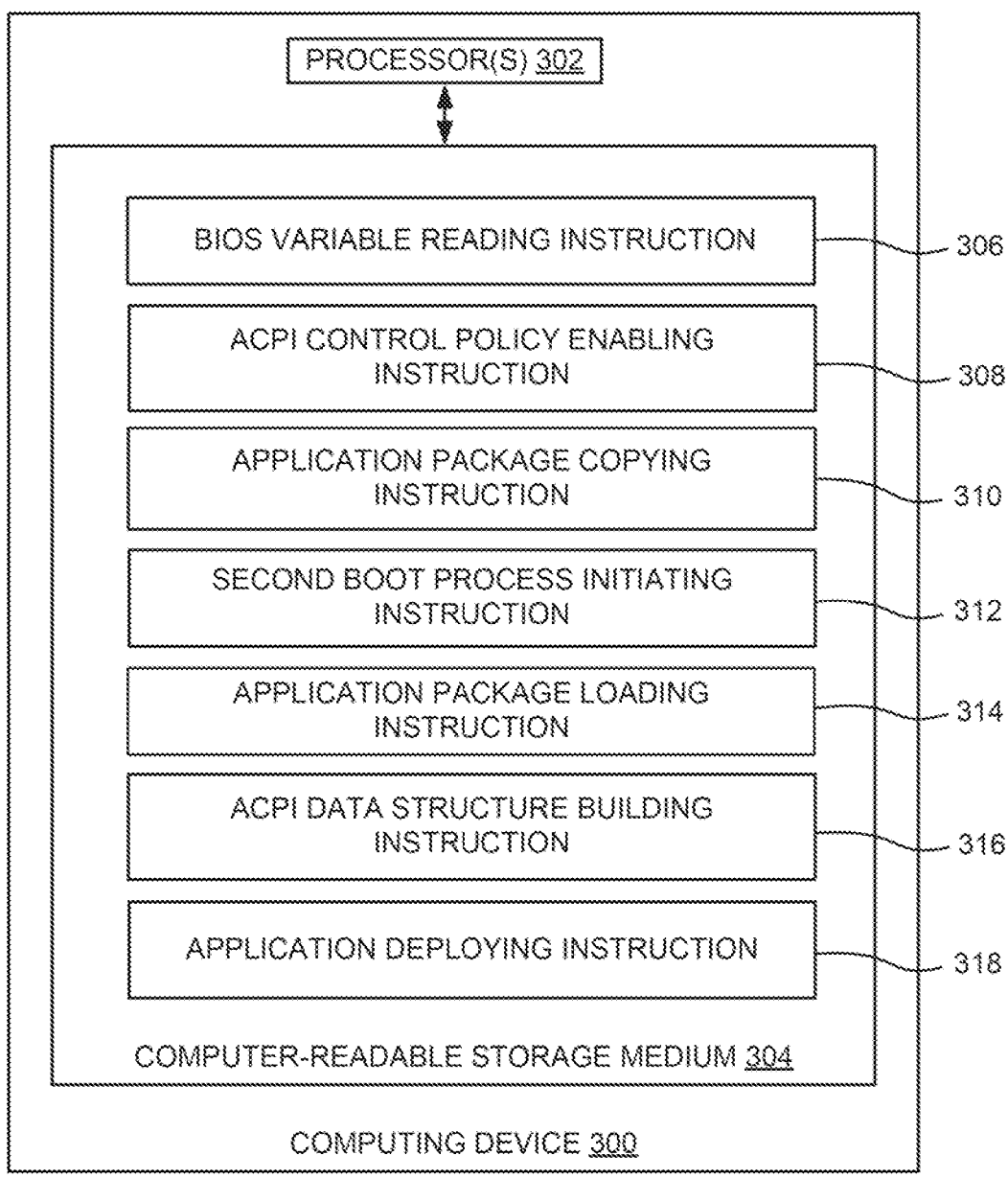
FIG. 3A is a block diagram of another example computing device including a non-transitory computer-readable storage medium, storing instructions to deploy an application in the computing device.

FIG. 3A is a block diagram of another example computing device 300 including a non-transitory computer-readable storage medium 304, storing instructions to deploy an application in computing device 300. Computing device 300 includes a processor 302 and computer-readable storage medium 304 communicatively coupled through a system bus. Processor 302 may be any type of CPU, microprocessor, or processing logic that interprets and executes computer-readable instructions stored in computer-readable storage medium 304.

Computer-readable storage medium 304 may be a random-access memory (RAM) or another type of dynamic storage device that may store information and computer-readable instructions that may be executed by processor 302. For example, computer-readable storage medium 304 may be synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, computer-readable storage medium 304 may be a non-transitory computer-readable medium, where the term "non-transitory" does not encompass transitory propagating signals. In an example, computer-readable storage medium 304 may be remote but accessible to computing device 300.

Computer-readable storage medium 304 stores instructions 306, 308, 310, 312, 314, 316, and 318. Instructions 306, 308, 310, and 312 may be executed by processor 302 during a first boot process of computing device 300. Instructions 314, 316, and 318 may be executed by processor 302 during a second boot process of computing device 300. Instructions 306 may be executed by processor 302 to read a BIOS variable from a non-volatile storage device during the first boot process. Instructions 308 may be executed by processor 302 to enable an ACPI control policy when the BIOS variable indicates a pending status of an application to be deployed. Instructions 310 may be executed by processor 302 to copy an application package from the BIOS variable to the non-volatile storage device (e.g., an EFI system partition of the non-volatile storage device) upon enabling the ACPI control policy.

Furthermore, computer-readable storage medium 304 may store instructions to delete the pending status of the BIOS variable upon copying the application package from the BIOS variable to the EFI system partition on the non-volatile storage device. Instructions 312 may be executed by processor 302 to initiate a second boot process of computing device 300. Instructions 314 may be executed by processor 302 to load the application package from the non-volatile storage device to a volatile storage device upon determining that the ACPI control policy is enabled during the second boot process.

Instructions 316 may be executed by processor 302 to build an ACPI data structure with the application package loaded in the volatile storage device. In an example, the ACPI data structure is a WPBT table that enables the BIOS to provide an operating system with a platform binary that the operating system can execute to deploy the application. Instructions 318 may be executed by processor 302 to deploy the application using the ACPI data structure. In an example, processor 302 may deploy the application using the ACPI data structure in accordance with a BIOS ACPI. The ACPI BIOS may generate ACPI tables (e.g., WPBT tables) and loads the ACPI tables into main memory.

Figure 3B:
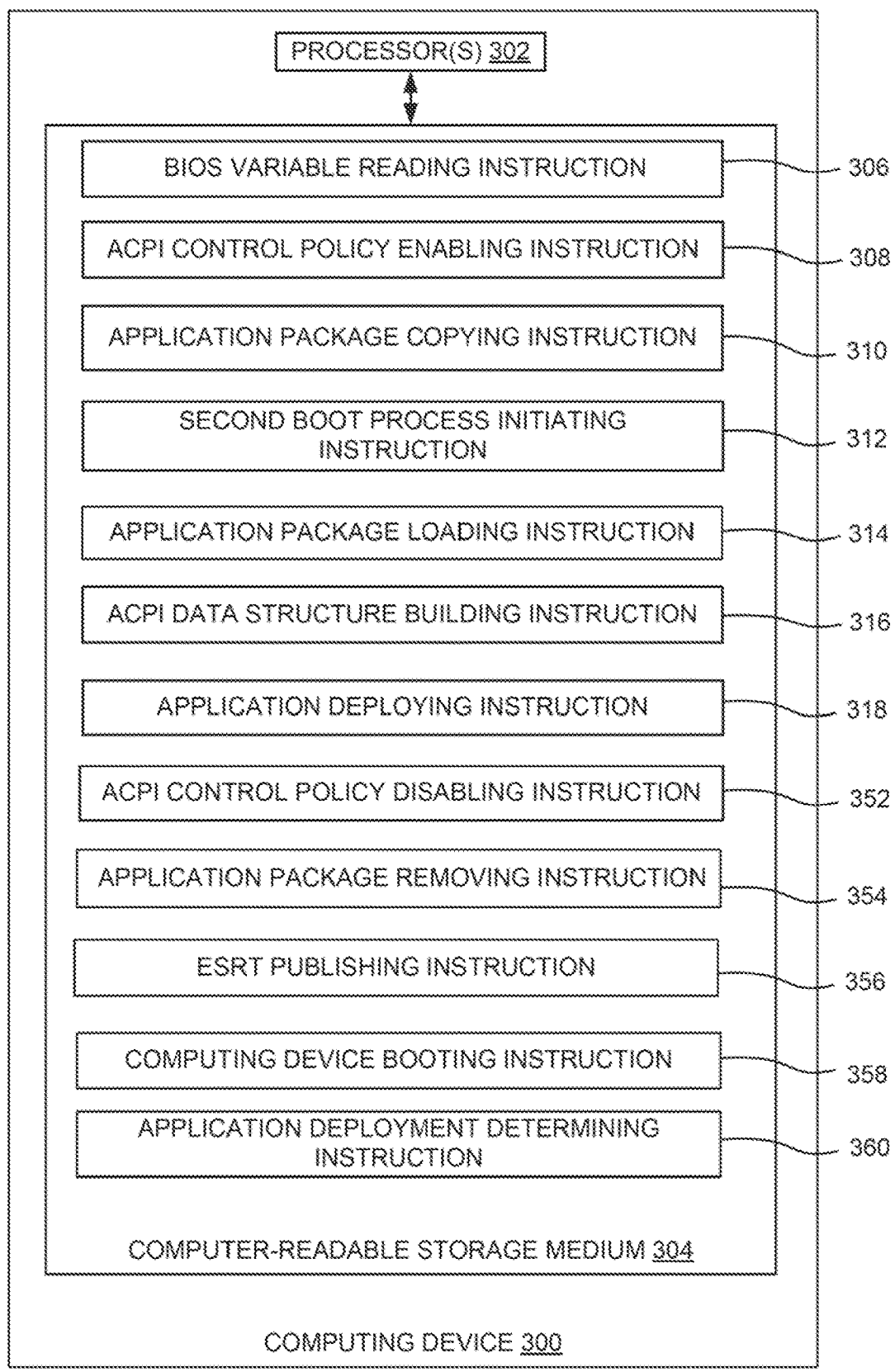
FIG. 3B is a block diagram of the example computing device of FIG. 3A, depicting additional features.

FIG. 3B is a block diagram of example computing device 300 of FIG. 3A, depicting additional features. For example, similarly named elements of FIG. 3B may be similar in structure and/or function to elements described with respect to FIG. 3A. As shown in FIG. 3B, computer-readable storage medium 304 stores instructions 352, 354, 356, 358, and 360. Instructions 352 may be executed by processor 302 to disable the ACPI control policy upon deploying the application.

Instructions 354 may be executed by processor 302 to remove the application package from the EFI system partition upon completion of deploying the application. Instructions 356 may be executed by processor 302 to populate an ESRT associated with a deployment node with a status information of the deployment of the application and publish the ESRT to the operating system of computing device 300. In an example, the deployment node is a BIOS setup menu option corresponding to the application. Further, the status information may indicate a success or failure of the deployment of the application, a current version of the deployed application, and a previous version of the application.

Instructions 358 may be executed by processor 302 to boot computing device 300 to load the operating system upon deploying the application in computing device 300. Instructions 360 may be executed by processor 302 to determine whether the application is to be installed or upgraded. For example, upon loading the operating system, processor 302 may utilize an update service to:

communicate with an external server via a network to determine whether the application is to be deployed based on the current version of the application in the ESRT, in response to determination that the application is to be deployed, obtain the application package from the external server, and report the obtained application package to a BIOS via a BIOS runtime service.

Figure 4:
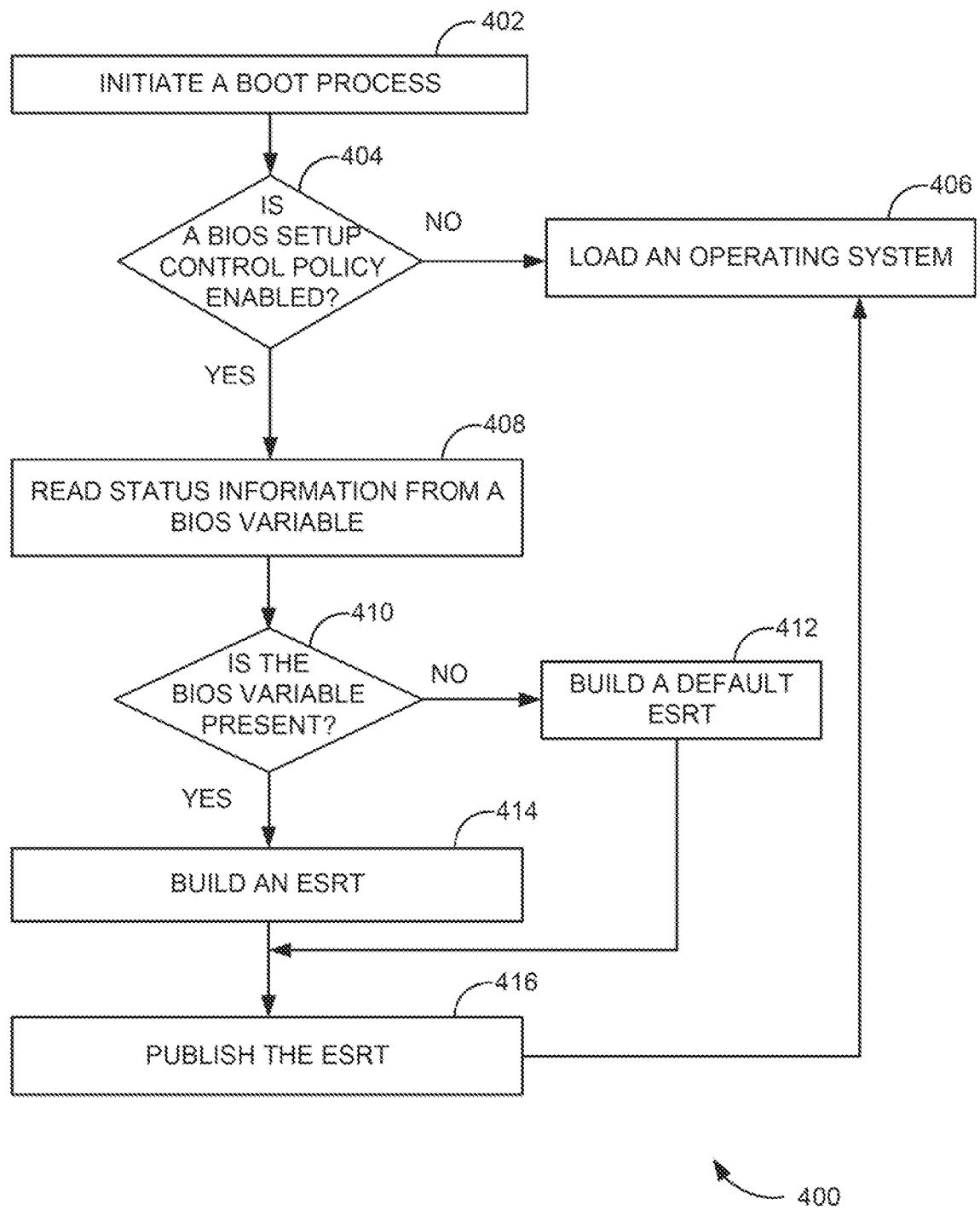
FIG. 4 is a flowchart illustrating an example process for publishing an extensible firmware interface (EFI) system resource table (ESRT) to an operating system of a computing device.

FIG. 4 is a flowchart illustrating an example process 400 for publishing an ESRT to an operating system of a computing device. In an example, a deployment node is compiled in a BIOS by an information technology (IT) administrator. The deployment node may be a BIOS setup menu option having a unique identifier corresponding to an application. The unique identifier may assist in identifying whether an external server (e.g., a Windows update server) has any application to be installed or upgraded in the computing device.

At 402, a boot process of the computing device is initiated. The term "boot process" may refer to a series of processes performed from the powering-on of the computing device to a completion of loading of the operating system and operating system applications. An example boot process may include a pre-extensible firmware interface (EFI) initialization (PEI) phase, a driver execution environment (DXE) phase, and a boot device select (BDS) phase for a UEFI boot process.

At 404, a check is made to determine whether a BIOS setup control policy associated with the deployment node is enabled. The BIOS setup control policy may control a deployment of the application associated with the deployment node. For example, the BIOS may follow a capsule architecture to report the deployment node to deploy the application with the unique identifier (e.g., a globally unique identifier (GUID)) based on enabling or disabling the BIOS setup control policy. When the BIOS setup control policy is disabled, process 400 goes to block 406 to load the operating system of the computing device.

At 408, when the BIOS setup control policy is enabled, the status information of the deployment of the application is read from a BIOS variable. The status information may indicate a success or failure of the deployment of the application, a current version of the deployed application, and a previous version of the application.

At 410, a check is made to determine a presence of the BIOS variable. When the BIOS variable is not present, at 412, a default ESRT is built corresponding to the deployment node. In an example, the BIOS variable is not be available when the deployment node is created to deploy a new application in the computing device. In this example, the default ESRT can indicate that the new application is to be installed for the deployment node.

At 414, when the BIOS variable is present, an ESRT is built for the deployment node based on the status information in the BIOS variable. At 416, the ESRT is published such that the ESRT can be utilized during the operating system runtime. Upon publishing the ESRT, process 400 goes to block 406 to load the operating system of the computing device. The ESRT may be utilized by an update service to communicate with the external server to determine whether the application is to be installed or upgraded.

Figure 5:
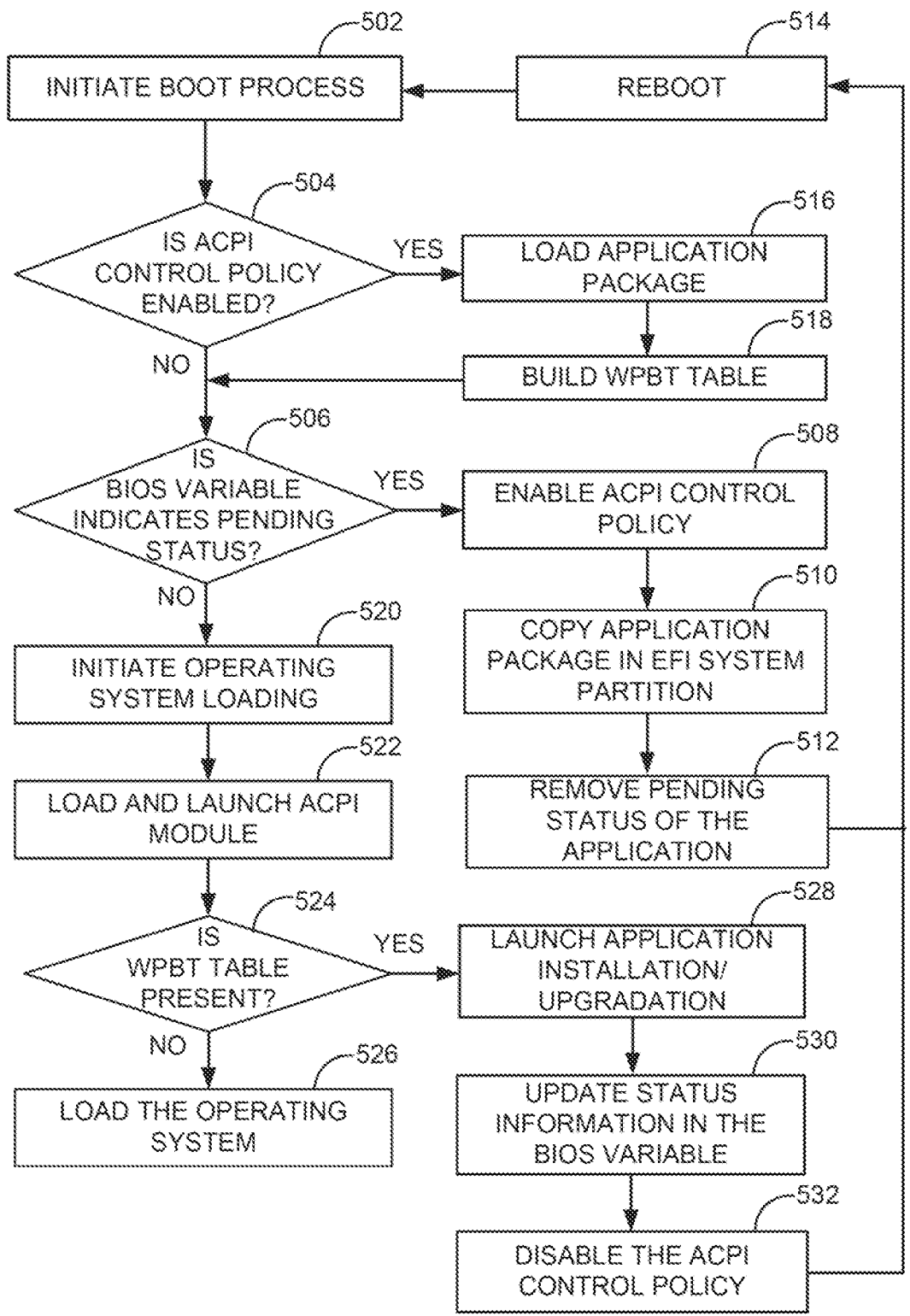
FIG. 5 is a flowchart illustrating an example process for deploying an application during a boot process of a computing device.

FIG. 5 is a flowchart illustrating an example process 500 for deploying an application during a boot process of a computing device. At 502, the boot process of the computing device is initiated. At 504, a check is made to determine whether an ACPI control policy is enabled during the boot process. The ACPI control policy, when enabled, may control the deployment of the application. At 506, when the ACPI control policy is not enabled, a check is made to determine whether a BIOS variable indicates a pending status of the application to be deployed. In an example, the BIOS variable is retrieved from a non-volatile storage device during the boot process. When the BIOS variable indicates the pending status of the application, at 508, the ACPI control policy is enabled. At 510, an application package is copied from the BIOS variable to an EFI system partition of the non-volatile storage device. At 512, the pending status of the application is removed from the BIOS variable upon copying the application package to the EFI system partition. Upon removing the pending status, at 514, a reboot of the computing device is initiated.

When the ACPI control policy is enabled during the boot process or the reboot process, at 516, the application package is loaded from the EFI system partition to a volatile memory. At 518, a WPBT table is built using the application package loaded in the volatile memory. In an example, the WPBT table may be built using a location information or address information of the application package loaded in the volatile memory. Upon building the WPBT table, at 520, loading of the operating system can be initiated.

At 522, an ACPI module is loaded and launched. The ACPI module may be a hardware abstraction interface between the BIOS, computer hardware components, and operating systems. Internally, the ACPI module may advertise available components and associated functions to an operating system kernel using instruction lists ("methods") provided through the BIOS, which the kernel parses.

At 524, a check is made, by the ACPI module, to determine whether the WPBT table is present. When the WPBT table is not present, at 526, the operating system is loaded in the computing device. When the WPBT table is present, at 528, an installation or upgradation of the application is launched using the WPBT table and the application package. At 530, the BIOS variable is updated with status information of the installation or upgradation of the application. At 532, the ACPI control policy is disabled upon updating the status information in the BIOS variable. Upon disabling the ACPI control policy, process 500 goes to block 514 to initiate a reboot of the computing device to load the operating system.

Figure 6:
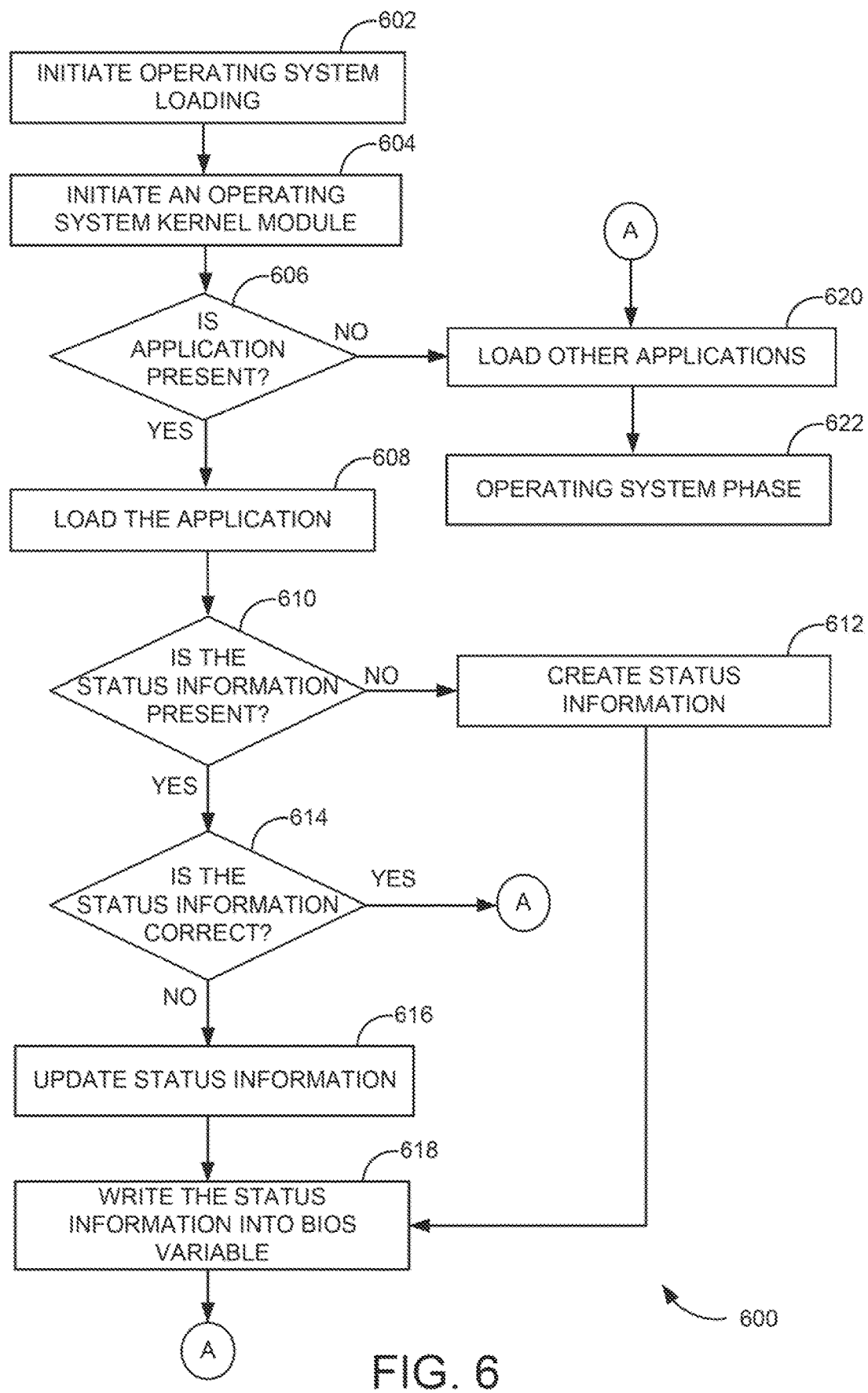
FIG. 6 is a flowchart illustrating an example process for creating or updating status information of a deployment of an application in a BIOS variable.

FIG. 6 is a flowchart illustrating an example process 600 for creating or updating status information of a deployment of an application in a BIOS variable. At 602, loading of an operating system is initiated during a boot process. At 604, an operating system kernel module is initiated (e.g., launched and started). The operating system kernel module may be a program for performing kernel tasks. At 606, a check is made to determine whether the application is installed and present.

When the application is present, at 608, the application is loaded in the computing device by the operating system kernel module. Upon loading the application, at 610, a check is made to determine whether the status information is present in the BIOS variable. When the status information is not present in the BIOS variable, at 612, the status information is created in a non-volatile storage device and process 600 goes to block 618.

When the status information is present in the BIOS variable, at 614, a check is made to determine an accuracy of the status information. When the status information is correct, the process goes to block 620. When the status information is not correct, at 616, the status information is updated in the non-volatile storage device. At 618, the generated status information or the updated status information is written into the BIOS variable for power on self-test (POST).

When the application is not present, the status information is correct, or upon writing the generated status information or the updated status information into the BIOS variable, at 620, other applications may be loaded in the computing device via the kernel module. At 622, the computing device is booted to the operating system phase.

Examples described herein eliminates an additional web page to place applications for download. Further, examples described herein eliminates pre-installation of the applications, thereby enhancing operating system dash process image performance. Also, examples described herein may reduce an enterprise management cost through the use of Windows/Linux update service. Furthermore, examples described herein does not involve an additional hardware cost for deploying the applications.

The processes depicted in FIGS. 4, 5, and 6 represent generalized illustrations, and those other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate computer-readable instructions, or use a combination of hardware and computer-readable instructions to perform the illustrated process.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A computing device comprising:
  a processor to:
    receive an application package associated with an application to be deployed;
    generate a basic input/output system (BIOS) variable including the application package, wherein the BIOS variable is to report to the BIOS that the application is to be deployed;
    store the BIOS variable in a non-volatile storage device; and
  a BIOS, wherein the BIOS, during a boot process of the computing device, is to:
    read the BIOS variable from the non-volatile storage device;
    enable an advanced configuration and power interface (ACPI) control policy when the BIOS variable indicates a pending status of the application to be deployed;
    detect that the application is to be deployed in the computing device based on the BIOS variable;
    load the application package from the non-volatile storage device into a volatile storage device upon determining that the ACPI control policy is enabled;
    build an advanced configuration and power interface (ACPI) data structure with the application package loaded in the volatile storage device; and
    deploy the application using the ACPI data structure.

2. The computing device of claim 1, wherein the BIOS is to update the BIOS variable to include a status information of the deployment of the application in the computing device, and wherein the status information is to indicate a success or failure of the deployment of the application, a current version of the deployed application, and a previous version of the application.

3. The computing device of claim 1, wherein the BIOS is to:
  populate an extensible firmware interface (EFI) system resource table (ESRT) with a status information of the deployment of the application; and
  publish the ESRT to an operating system of the computing device.

4. The computing device of claim 3, further comprising:
  a processor, upon loading the operating system of the computing device, to utilize an update service to:
    communicate with an external server via a network to determine whether the application is to be deployed based on the status information in the ESRT;
    in response to determination that the application is to be deployed, obtain the application package from the external server;
    generate the BIOS variable including the obtained application package in the non-volatile storage device; and
    store the BIOS variable in the non-volatile storage device via a BIOS runtime service.

5. The computing device of claim 1, wherein the ACPI data structure is a Windows platform binary table (WPBT) that enables the BIOS to provide an operating system with a platform binary that the operating system can execute to deploy the application.

6. The computing device of claim 1, wherein the BIOS is to remove the application package from the non-volatile storage device upon completion of deploying the application.

7. A non-transitory computer-readable storage medium encoded with instructions that, when executed by a processor of a computing device, cause the processor to:
  receive an application package associated with an application to be deployed;
  generate a basic input/output system (BIOS) variable including the application package, wherein the BIOS variable is to report to a BIOS that the application is to be deployed;
  store the BIOS variable in a non-volatile storage device of the computing device via a BIOS runtime service;
  recommend booting the computing device upon storing the BIOS variable;
  during a boot process:
    read the BIOS variable from the non-volatile storage device;
    enable an advanced configuration and power interface (ACPI) control policy when the BIOS variable indicates a pending status of the application to be deployed;
    detect that the application is to be deployed based on the BIOS variable; and
    deploy the application in the computing device using the application package in the non-volatile storage device.

8. The non-transitory computer-readable storage medium of claim 7, wherein instructions to generate the BIOS variable comprise instructions to:
  utilize an update service running in the computing device to communicate with an external server via a network to determine whether the application is to be deployed;
  in response to determination that the application is to be deployed, receive the application package from the external server; and
  generate the BIOS variable including the received application package.

9. The non-transitory computer-readable storage medium of claim 8, wherein the external server is a Windows update server, and wherein the update service is a Windows update service.

10. The non-transitory computer-readable storage medium of claim 7, further comprising instructions to:
  during the boot process, update the BIOS variable to include a status information of the deployment of the application in the computing device, wherein the status information is to indicate a success or failure of the deployment of the application, a current version of the deployed application, and a previous version of the application.

11. The non-transitory computer-readable storage medium of claim 7, further comprising instructions to:
  populate an extensible firmware interface (EFI) system resource table (ESRT) with a status information of the deployment of the application; and
  publish the ESRT to an operating system of the computing device, wherein the ESRT is used by an external server to determine whether the application is to be deployed.

12. The non-transitory computer-readable storage medium of claim 7, further comprising instructions to:
  create, by the BIOS, a deployment node in a BIOS setup menu; and
  receive, by an operating system, the application package associated with the deployment node from an update service.

13. The non-transitory computer-readable storage medium of claim 7, wherein instructions to deploy the application in the computing device using the application package comprise instructions to:
- load the application package from the non-volatile storage device into a volatile storage device;
- build an advanced configuration and power interface (ACPI) data structure with the application package loaded in the volatile storage device; and
- deploy the application using the ACPI data structure.

14. A non-transitory computer-readable storage medium encoded with instructions executable by a processor of a computing device to:
- receive an application package associated with an application to be deployed;
- generate a basic input/output system (BIOS) variable including the application package, wherein the BIOS variable is to report to a BIOS that the application is to be deployed;
- during a first boot process:
  - read the BIOS variable from a non-volatile storage device;
  - enable an advanced configuration and power interface (ACPI) control policy when the BIOS variable indicates a pending status of an application to be deployed;
  - copy an application package from the BIOS variable to the non-volatile storage device upon enabling the ACPI control policy;
  - initiate a second boot process of the computing device; and
- during the second boot process:
  - load the application package from the non-volatile storage device to a volatile storage device upon determining that the ACPI control policy is enabled;
  - build an ACPI data structure with the application package loaded in the volatile storage device; and
  - deploy the application using the ACPI data structure.

15. The non-transitory computer-readable storage medium of claim 14, further comprising instructions to:
- disable the ACPI control policy upon deploying the application.

16. The non-transitory computer-readable storage medium of claim 14, further comprising instructions to:
- delete the pending status of the BIOS variable upon copying the application package from the BIOS variable to an extensible firmware interface (EFI) system partition on the non-volatile storage device.

17. The non-transitory computer-readable storage medium of claim 16, further comprising instructions to:
- remove the application package from the EFI system partition upon completion of deploying the application.

18. The non-transitory computer-readable storage medium of claim 14, further comprising instructions to:
- populate an extensible firmware interface (EFI) system resource table (ESRT) associated with a deployment node with a status information of the deployment of the application, wherein the deployment node is a BIOS setup menu option corresponding to the application, and wherein the status information is to indicate a success or failure of the deployment of the application, a current version of the deployed application, and a previous version of the application; and
- publish the ESRT to an operating system of the computing device.

19. The non-transitory computer-readable storage medium of claim 18, further comprising instructions to:
- boot the computing device to load the operating system upon deploying the application in the computing device; and
- upon loading the operating system, utilize an update service to:
  - communicate with an external server via a network to determine whether the application is to be deployed based on the current version of the application in the ESRT;
  - in response to determination that the application is to be deployed, obtain the application package from the external server; and
  - report the obtained application package to a BIOS via a BIOS runtime service.

20. The non-transitory computer-readable storage medium of claim 14, wherein the ACPI data structure is a Windows platform binary table (WPBT) that enables the BIOS to provide an operating system with a platform binary that the operating system can execute to deploy the application.

* * * * *